US007266584B2

(12) United States Patent
Mullen et al.

(10) Patent No.: US 7,266,584 B2
(45) Date of Patent: Sep. 4, 2007

(54) ELECTRONIC MAIL DISTRIBUTION VIA A NETWORK OF COMPUTER CONTROLLED DISPLAY TERMINALS WITH INTERACTIVE DISPLAY INTERFACES ENABLING SENDERS/RECEIVERS TO VIEW SEQUENCES OF ONLY TEXT FROM SEQUENCES OF E-MAIL HAVING SAME HEADERS

(75) Inventors: Shawn Patrick Mullen, Buda, TX (US); Johnny Meng-Han Shieh, Austin, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 10/464,896

(22) Filed: Jun. 19, 2003

(65) Prior Publication Data

US 2004/0260772 A1 Dec. 23, 2004

(51) Int. Cl.
*G06F 15/16* (2006.01)
(52) U.S. Cl. ..................... 709/206; 709/217
(58) Field of Classification Search ........ 709/200–207, 709/217–227
See application file for complete search history.

(56) References Cited

U.S. PATENT DOCUMENTS

| | | | | |
|---|---|---|---|---|
| 6,591,292 B1 * | 7/2003 | Morrison et al. | ........... | 709/206 |
| 6,704,772 B1 * | 3/2004 | Ahmed et al. | ............... | 709/207 |
| 6,717,957 B1 * | 4/2004 | Quine | ........................ | 370/487 |
| 6,826,596 B1 * | 11/2004 | Suzuki | ........................ | 709/206 |
| 6,920,564 B2 * | 7/2005 | Decuir | ........................ | 713/189 |
| 6,963,904 B2 * | 11/2005 | Yong | ........................... | 709/207 |
| 6,971,064 B2 * | 11/2005 | Chien et al. | ................. | 715/758 |
| 7,003,551 B2 * | 2/2006 | Malik | ........................ | 709/206 |
| 7,024,458 B2 * | 4/2006 | Chan et al. | .................. | 709/206 |
| 7,028,263 B2 * | 4/2006 | Maguire | ...................... | 715/758 |
| 2002/0029247 A1 * | 3/2002 | Kawamoto | .................. | 709/206 |
| 2004/0147280 A1 * | 7/2004 | Kamiya | .................... | 455/550.1 |
| 2005/0144246 A1 * | 6/2005 | Malik | .......................... | 709/206 |

* cited by examiner

*Primary Examiner*—Moustafa M. Meky
(74) *Attorney, Agent, or Firm*—Jerry B. Kraft; Mark E. McBurney; Libby Z Handelsman

(57) ABSTRACT

A display interface at a sending/receiving display terminal including the conventional implementations for reading and sending E-Mail with an implementation for organizing the text content of a chronological sequence of E-Mail documents having the same subject identifier or header. There is designated a subject identifier of one received electronic mail as a message text sequencer and there is an implementation at a receiving display station for enabling the display of a chronological sequence of the text of said received message and the text of all subsequent messages having said designated subject identifier. The designation of the identifier may automatically designate a subject identifier as a message text sequencer based upon user predetermined attributes. Such an implementation for automatically designating may include the combination of means for counting the number of messages having the same subject identifier within a predetermined period in combination with means for automatically designating the same subject identifier when said counted number reaches a predetermined value. In its simplest application, the predetermined value may be two, e.g. even two consecutive messages.

20 Claims, 8 Drawing Sheets

ELECTRONIC MAIL DISTRIBUTION VIA A NETWORK OF COMPUTER CONTROLLED DISPLAY TERMINALS WITH INTERACTIVE DISPLAY INTERFACES ENABLING SENDERS/RECEIVERS TO VIEW SEQUENCES OF ONLY TEXT FROM SEQUENCES OF E-MAIL HAVING SAME HEADERS

TECHNICAL FIELD

The present invention relates to computer managed communication networks, such as the World Wide Web (Web) or like private networks, and particularly to electronic mail (E-Mail) messages transmitted over such networks to display terminals.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents. The Web or Internet, which had quietly existed for over a generation as a loose academic and government data distribution facility, reached "critical mass" and commenced a period of phenomenal expansion. With this expansion, businesses and consumers have direct access to all matter of documents and media through the Web. Also, as a result of the rapid expansion of the Web, E-Mail, which has been distributed for over 25 years over smaller private and specific purpose networks, has moved into distribution over the Web due to the vast distribution channels that are available.

The availability of extensive E-Mail distribution channels has made it possible to keep all necessary parties in business, government and public organizations completely informed of all transactions that they need to know about at almost nominal costs. However, there can be too much of a good thing. The availability of cheap E-Mail has led to an undesirable proliferation of E-Mail that many executive, management, professional and technical individuals are forced to handle. Our concern for this proliferation of E-Mail is not directed to conventional junk mail, i.e. E-Mail with subject matter in which the receiver has little or no interest. There are currently available a variety of application programs by which the user may filter out undesirable junk mail through the application of selected criteria appropriate to the user.

The E-Mail subject matter creating the proliferation problem to which the present invention is directed is often subject matter of great interest to the parties receiving copies or forwards of the E-Mail documents. However, problems arise when there is an exchange of E-Mail related to the same subject that may involve reply after reply or copy after copy of reply after reply. Particularly, when there are several people being copied and a thread of several E-Mails related to the subject at hand, it is sometimes quite bothersome to try to determine who received what. With the ability to attach all past E-Mail correspondence at the user's fingertips, it is frequently the case that the whole historical thread of documents is attached to each new E-Mail message even though the message may just be a couple of lines in length.

As a result, it may often be the case that an E-Mail user may find himself in a situation where a thread of E-Mail documents with a thread of ten or twelve lines of meaningful text may have to process and store ten or more times that amount of data because of superfluous attaching.

The conventional art does provide lists of the subject identifiers, e.g. headers of received E-Mail, as well as lists of headers of sent E-Mail. Also, these may be chronologically coordinated in an all E-Mail or all documents list or view. In addition, Lotus Notes™ will even cull out from its "All Documents", lists chronologically listing the headers of a thread of E-Mail documents with the same headers. However, the user must run through the thread and pull up and view each document in the thread one by one including all of the attachments to the documents.

SUMMARY OF THE PRESENT INVENTION

The present invention provides an electronic mail distribution system for a network, e.g. Internet E-Mail transmitted between interactive display terminals. The invention offers a solution to the above problems by providing a display interface at a sending/receiving display terminal including the conventional implementations for reading and sending E-Mail. In addition, the invention provides the user with means for organizing the text content of a chronological sequence of E-Mail documents having the same subject identifier or header that is intuitive, easy to follow and avoids the clutter of repetitive attachments from the thread of correspondence history that is distracting and confusing. The invention also enables the user to selectively eliminate the storage of most of this repetitive document correspondence history to thereby conserve valuable storage capacity.

Thus, in communication networks such as the Web, the present invention operates in an environment combining means for transmitting electronic mail messages to receiving display stations, means for including a subject identifier, e.g. header in each transmitted message, and means at the receiving display stations for displaying a list of the subject identifiers of received electronic mail messages. The invention then provides the further combination of means for designating a subject identifier of one received electronic mail as a message text sequencer, and means at the receiving display station for enabling the display of a chronological sequence of the text of said received message and the text of all subsequent messages having said designated subject identifier.

The implementation may enable the user himself to interactively designate an identifier as a message text sequencer. Alternatively, the means for designating the identifier may automatically designate a subject identifier as a message text sequencer based upon user predetermined attributes. Such means for automatically designating may include the combination of means counting the number of messages having the same subject identifier within a predetermined period in combination with means for automatically designating the same subject identifier when said counted number reaches a predetermined value. In its simplest application, the predetermined value may be two, e.g. even two consecutive messages.

In one embodiment of the invention, there are means for listing said message text sequencers in said list of subject identifiers or headers of the subject identifier or header for said chronological sequence of text.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
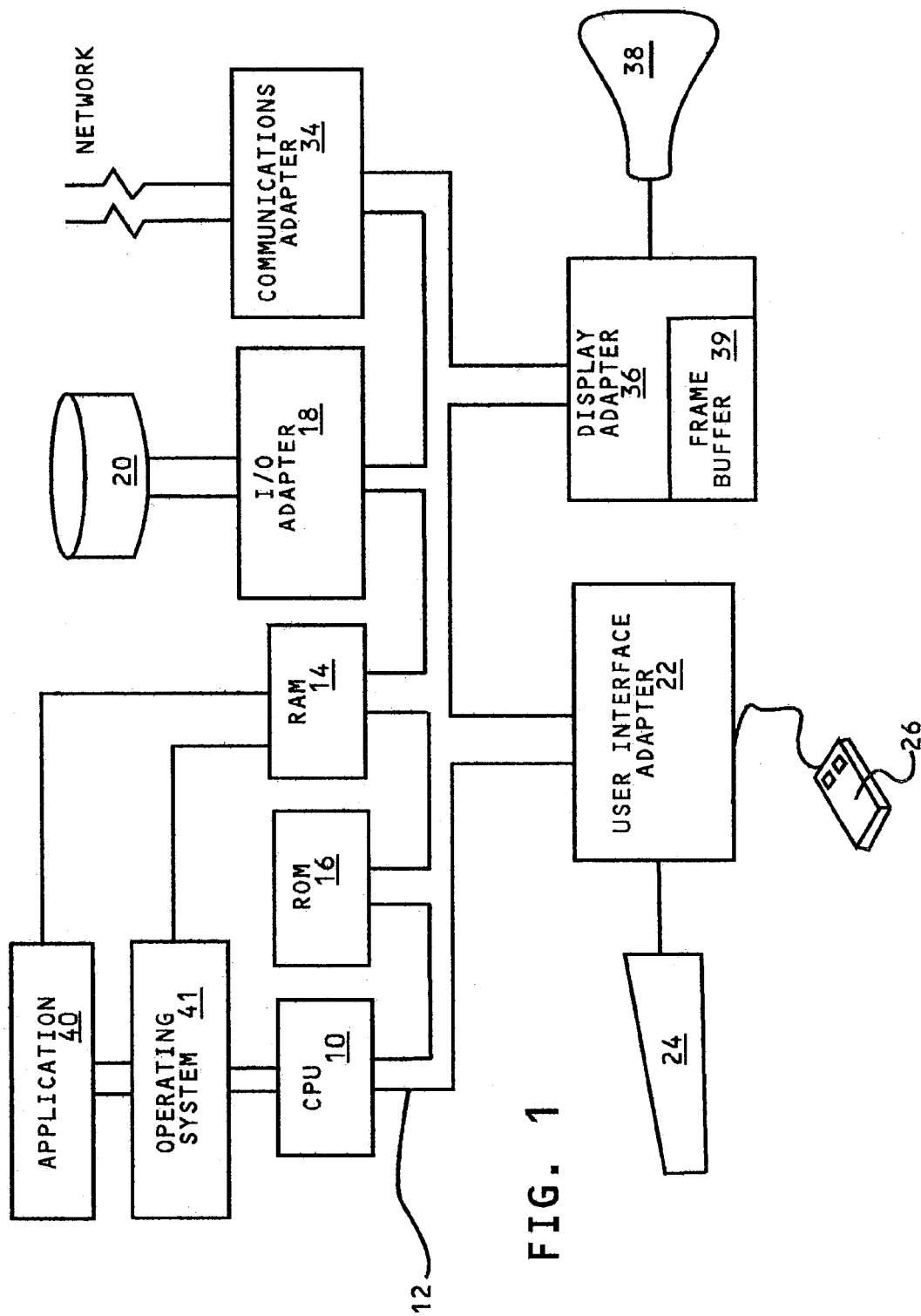
FIG. 1 is a block diagram of a data processing system including a central processing unit and network connections via a communications adapter that is capable of implementing the interactive display terminals, as well as servers in the Internet or Web E-Mail distribution of this invention.

Referring to FIG. 1, a typical data processing system is shown that may function as the computer controlled network terminals or Web stations used conventionally as any of the sending or receiving Web stations for electronic mail transmission. The system shown is also illustrative of any of the server computers used for the Web E-Mail distribution to be described in greater detail with respect to FIG. 2.

A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000™(RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 600T™ operating system available from IBM; Microsoft's Windows XP™ or Windows2000™, as well as UNIX and AIX operating systems. Application programs 40, controlled by the system, are moved into and out of the main memory Random Access Memory (RAM) 14. These programs include the programs of the present invention for enabling senders of E-Mail documents to set up a process for designating headers as message text sequencers and the setting up of message text sequence documents represented by such headers. Where the computer system shown functions as the receiving Web station, then any conventional Web browser application program, such as the Microsoft's Internet Explorer™, will be available for accessing E-Mail from the Web and for sending E-Mail to the Web from the network station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to E-Mail documents transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to the lower level objects in the hierarchy through a variety of network server computers. E-Mail is distributed through such a network.

Figure 2:
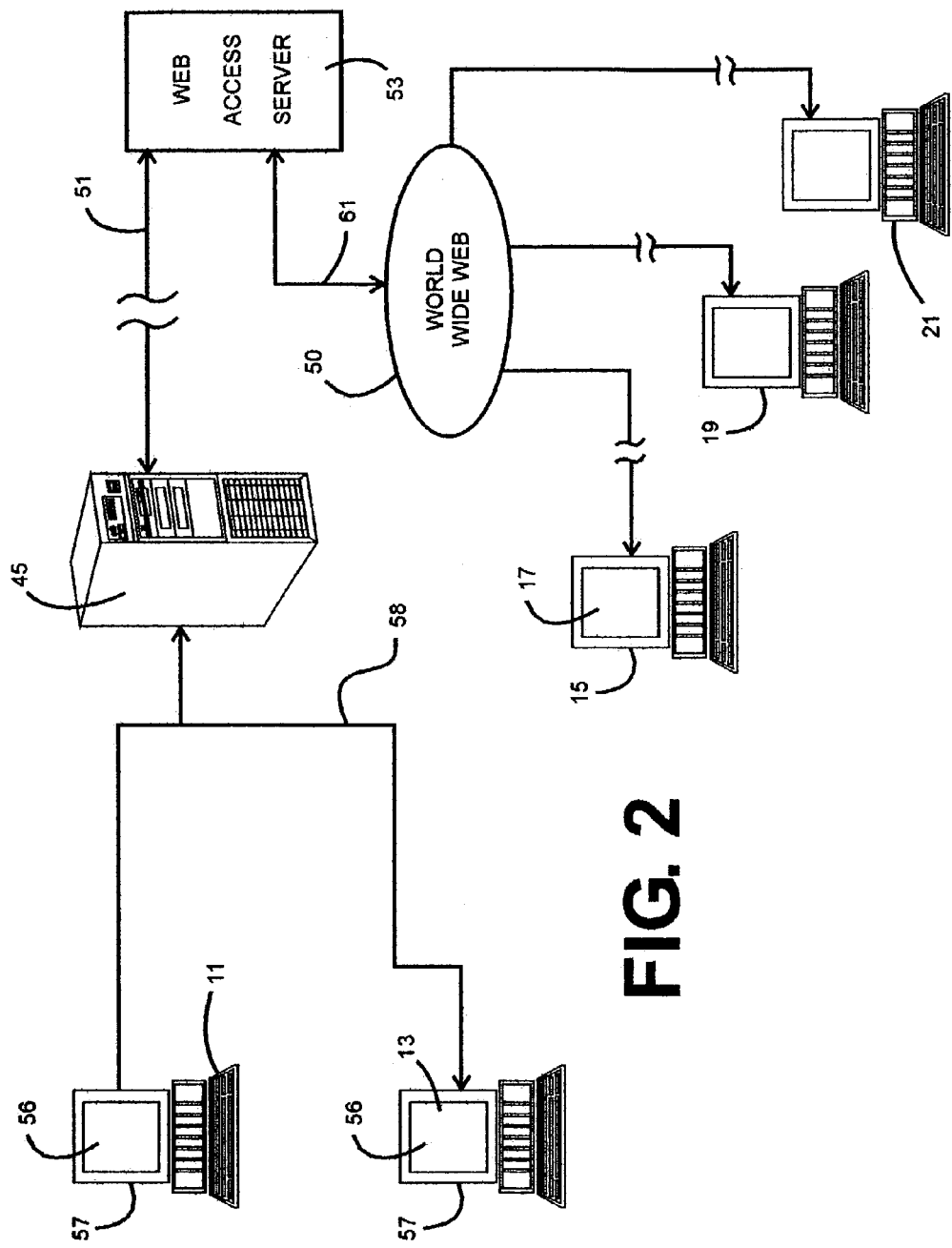
FIG. 2 is a generalized view of an E-Mail distribution system in a Web or Internet that may be used in the practice of the present invention.

A generalized diagram of a portion of the Web for illustration of the E-Mail distribution system of the present invention is shown in FIG. 2. The computer controlled display terminals 11 and 13 have displays 57 upon which E-Mail documents 56 may be created by senders and displayed. Terminals 11 and 15 may be implemented by the computer system set up in FIG. 1, and connection 58 (FIG. 2) is the network connection shown in FIG. 1. For purposes of the present embodiment, terminals 11 and 13 serve as a Web display station for the sending of E-Mail via the display interfaces to be described with respect to FIGS. 3 through 6 via Web browser programs. Reference may be made to the above-mentioned *Mastering the Internet*, pp. 136-147, for typical connections between local display stations to the Web via network servers, any of which may be used to implement the system on which this invention is used. In the typical set up shown, terminals are connected via, let us say, host dial connections (not shown) to server 45 provided by a Web Service Provider that in turn accesses the Web 50 via connection 51 to a Web access server 53 and connection 61.

For the purpose of this embodiment, E-Mail is created on either terminal 11 or 13 and sent over the Web 50 to receiving terminals 15, 19 or 21.

Figure 3:
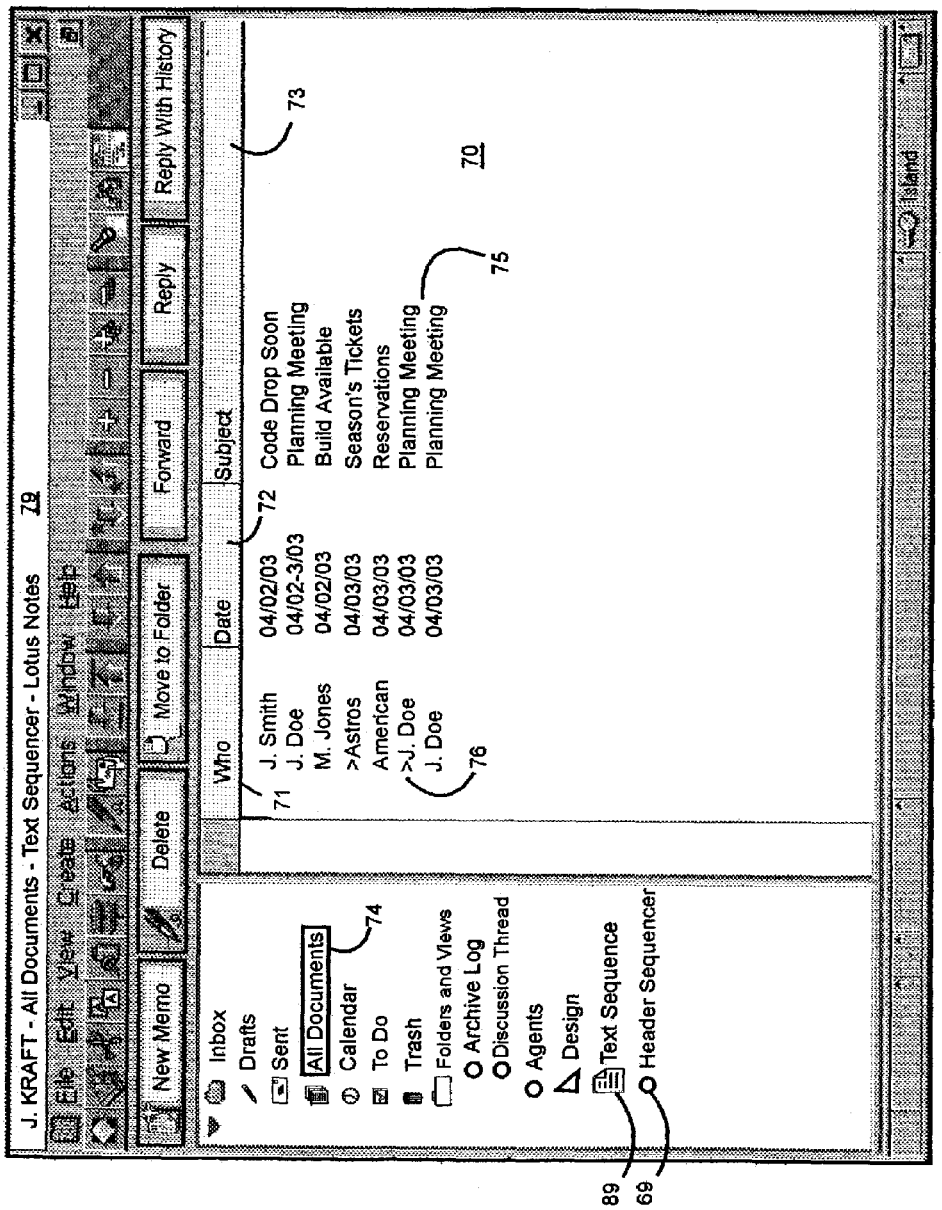
FIG. 3 is a diagrammatic illustration of an interactive display interface used for the listing of the subject identifiers or headers of received or sent E-Mail (in this case, the list shown in an All Documents view that is a chronological list of all sent and received E-Mail)

Within this E-Mail network set up, we will now consider the illustrative E-Mail distribution to be described with respect to FIGS. 3 through 6. In FIG. 3, there is illustrated a listing panel 70 listing the subject identifiers or headers of recent E-Mail in a chronological order by date 72, subject 73 or header, and who 71 it was sent to or received from. These are conventional interactive E-Mail list panels or screens that may list either sent or received E-Mail or, as in the present illustration, both received and sent E-Mail documents are listed together in an "All Documents" listing mode as implemented in Lotus Notes™. This mode was entered into by clicking on item 74 with an interactive pointing device, e.g. mouse (not shown), and is indicated in title bar 79. This is all of J. Kraft's E-Mail with sent mail being indicated by a >76 next to the name. As mentioned previously, the E-Mail text sequence mode may be initiated automatically or by the user. In the present example, the user notes that the header "Planning Meeting" identifies five E-Mail messages. As a result, the user decides to activate the text sequencer mode and points to and clicks on the uppermost entry on the list with a "Planning Meeting" header and then clicks on item 69 "Header Sequencer". This action designates that header as the text sequencer header 77 shown in bold print to indicate that it is highlighted in the next panel shown in FIG. 4. All of the other individual E-Mail documents listed in list 75 with the header "Planning Meeting" have been removed and the text of such documents incorporated into a single displayable text sequence document to be subsequently described in greater detail with respect to FIG. 6. It should be noted that the text sequence document of FIG. 6 may be brought up simply by clicking on header 77.

Figure 6:
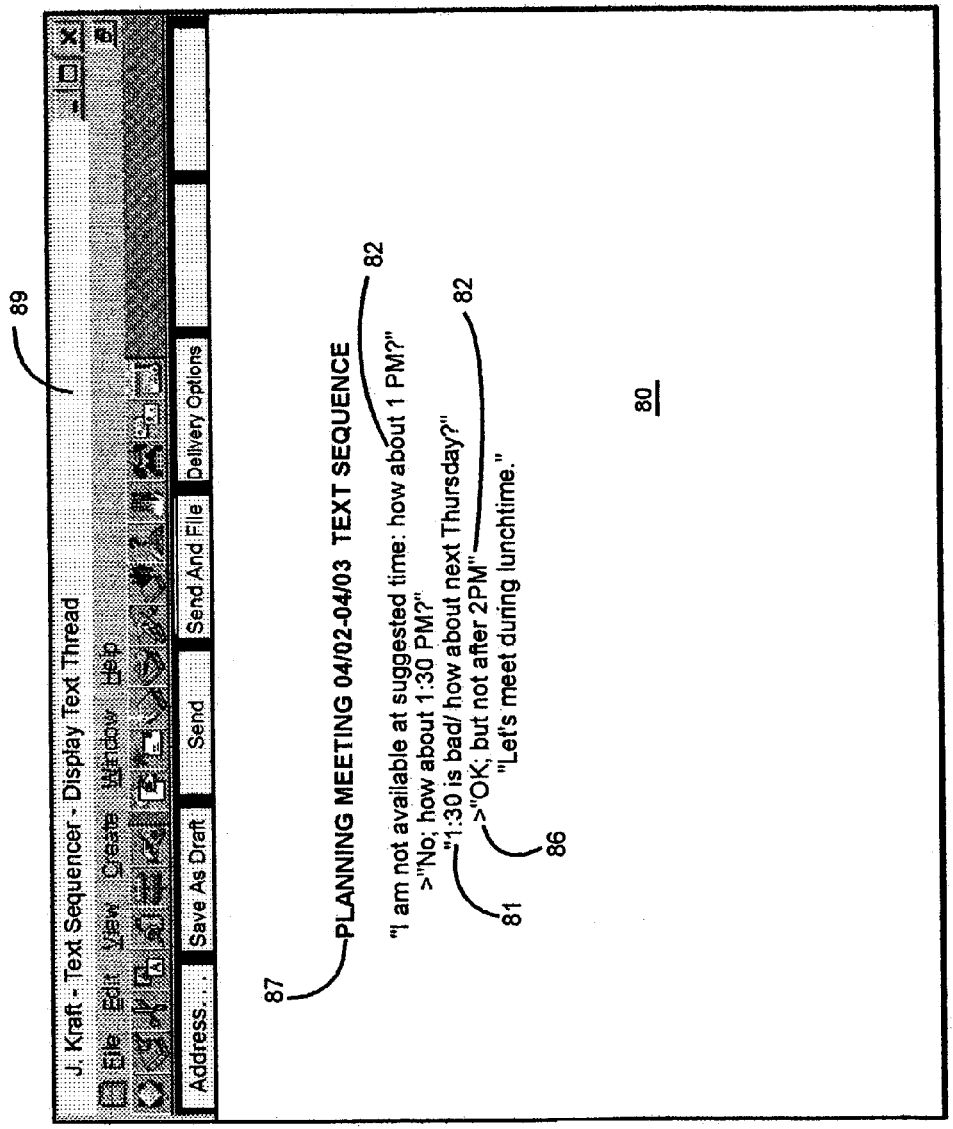
FIG. 6 is a diagrammatic illustration of a message text sequencer document, e.g. as represented by the message text sequencer header.

Accordingly, instead of having to rummage through several of the documents having their five separate "Planning Meeting" headers of FIG. 3, the user in FIG. 6 has J. Kraft's Text Sequencer—Text Thread 89 listed in chronological order under header 87 on panel 80 with a thread 81 of the text contents 82 in each of the E-Mails with the text from a sent E-Mail being distinguished by a >86 from the text of a received E-Mail.

Figure 4:
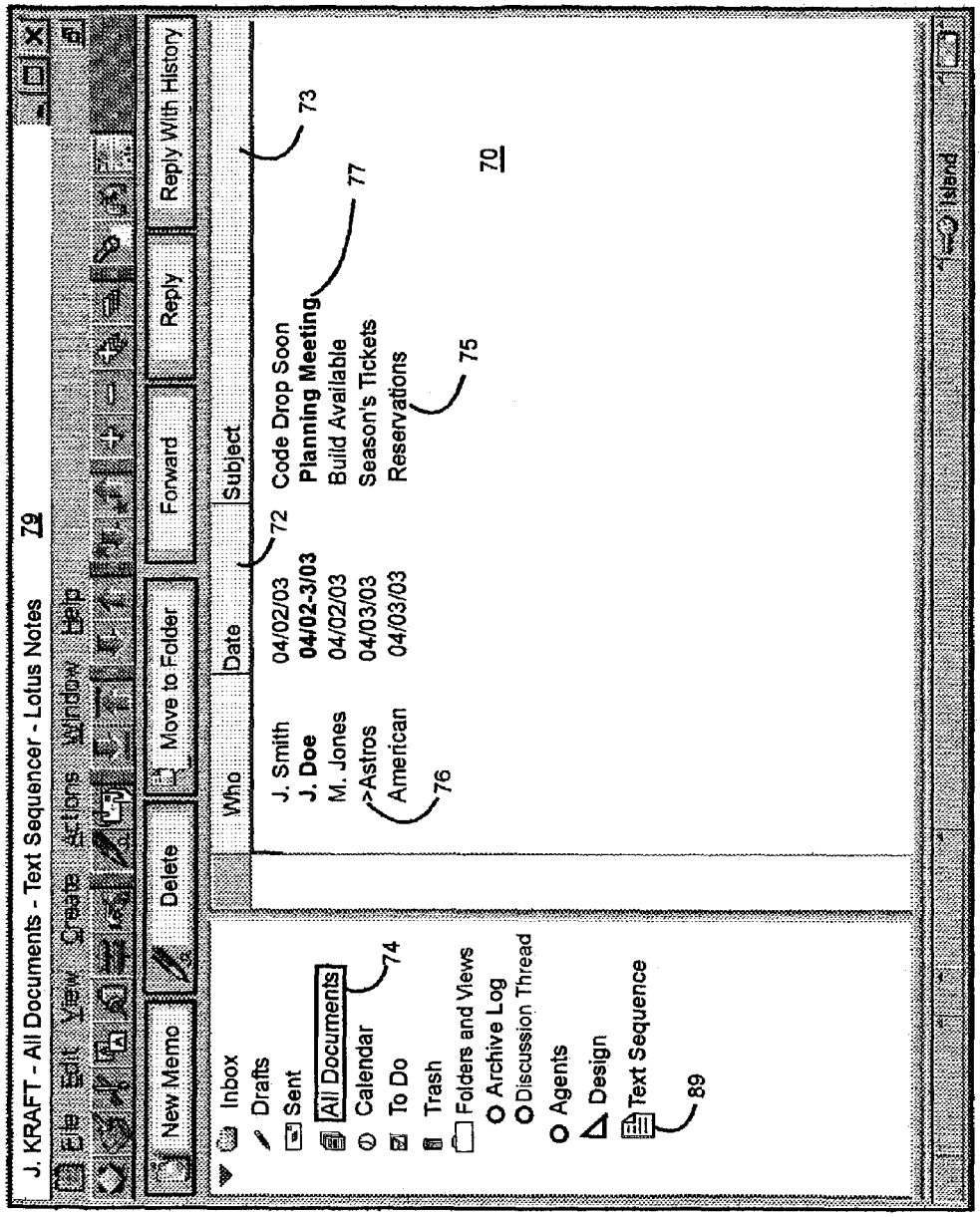
FIG. 4 is the display interface of FIG. 3 after one of the listed headers has been designated as a message text sequencer header.

If the user wishes to save storage space, he may delete all of the five "Planning Meeting" notes and their attachments and just rely on the text sequence document of FIG. 6 as represented by designated text sequence header 77 in FIG. 4. On the other hand, there may be circumstances where the user chooses not to discard the notes in which the content has been incorporated into a text sequence document. In such a case, the display interface may be set up with a text sequence item 89 (FIGS. 3 and 4) that permits the user to toggle between the shortened list in FIG. 4 and the full original header list of FIG. 3 by simply clicking on item 89.

Figure 5:
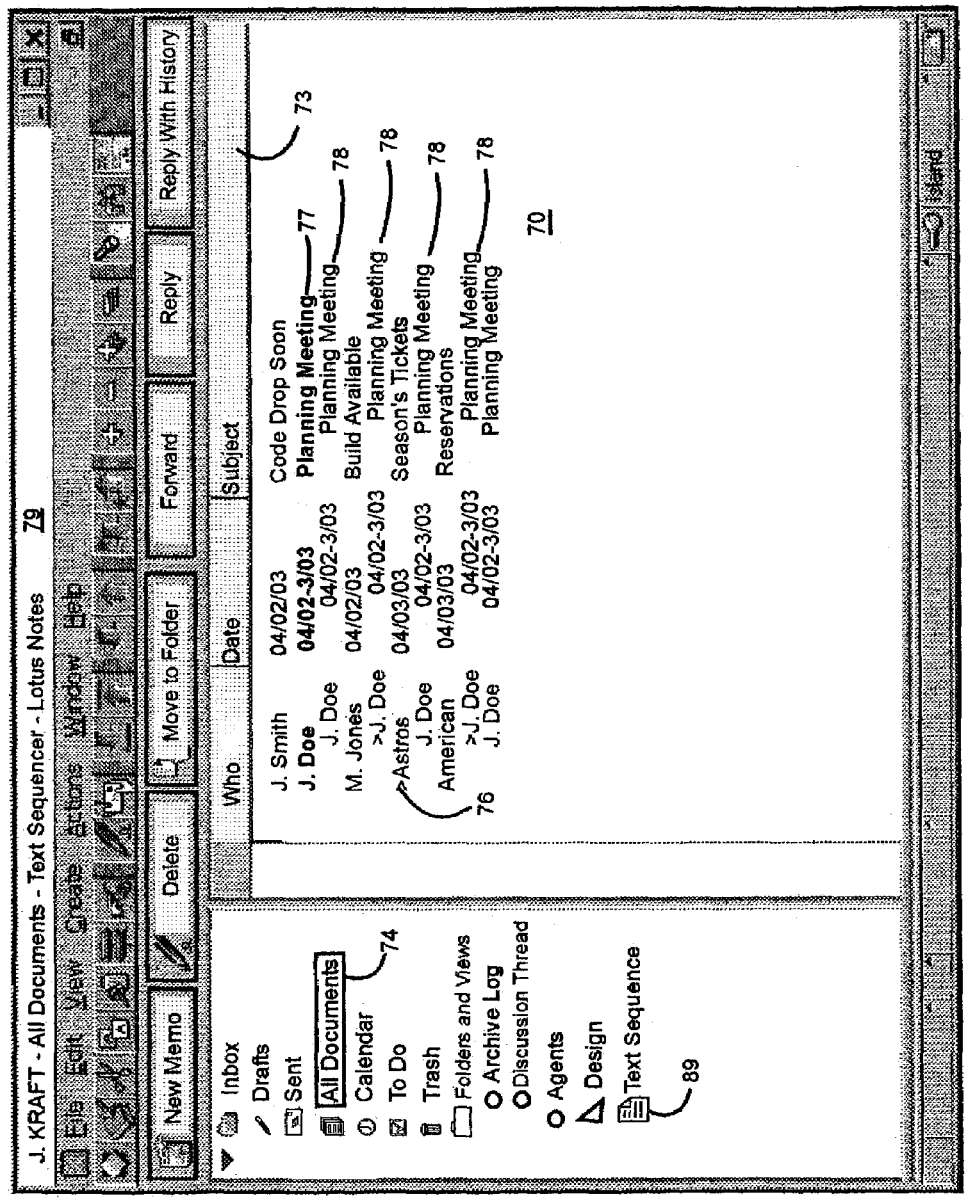
FIG. 5 is a display interface like that of FIG. 4 but of an alternative embodiment wherein the same headers of the chronological sequence of E-Mails the text of each of which has been already incorporated into a message text sequencer are still listed in indented form.

In addition, where the user wishes to retain rather than discard the notes the content of which has been incorporated into a text sequence document, an interface such as that shown in FIG. 5 may be presented to the user. From this panel 70, the user may click on highlighted designated text sequence header 77 to access the text sequence document of FIG. 6 as represented by designated text sequence header 77 or he may still click on any of the five individual E-Mail headers 78 to access each of the individual E-Mail documents.

In forming the text sequence document of FIG. 6, the text may extracted by any conventional cut/paste-like technique provided by the operating system. In setting up the extracting of the pertinent text, it is important to note that only the text of the latest E-Mail note in the sequence may be extracted and not any of the attached E-Mail notes in the sequence history.

In the simplified illustrations given above, we have described an embodiment wherein the user decides the point when a particular repetitive header should be designated as a message text sequencer. The system may be set up to do this automatically. In a simple embodiment of this, repetitive headers are counted. The user, during a predetermining set up, enters a count of the number of repetitions during a set period. This period may be a period of time, e.g. three repetitions per day, or the period may be based upon the frequency of E-Mail transmissions, e.g. two repetitions per five E-Mail transmissions. The appropriate count per time period would trigger the designation of the repetitive header as the message text sequence and set the text extraction in motion.

Figure 7:
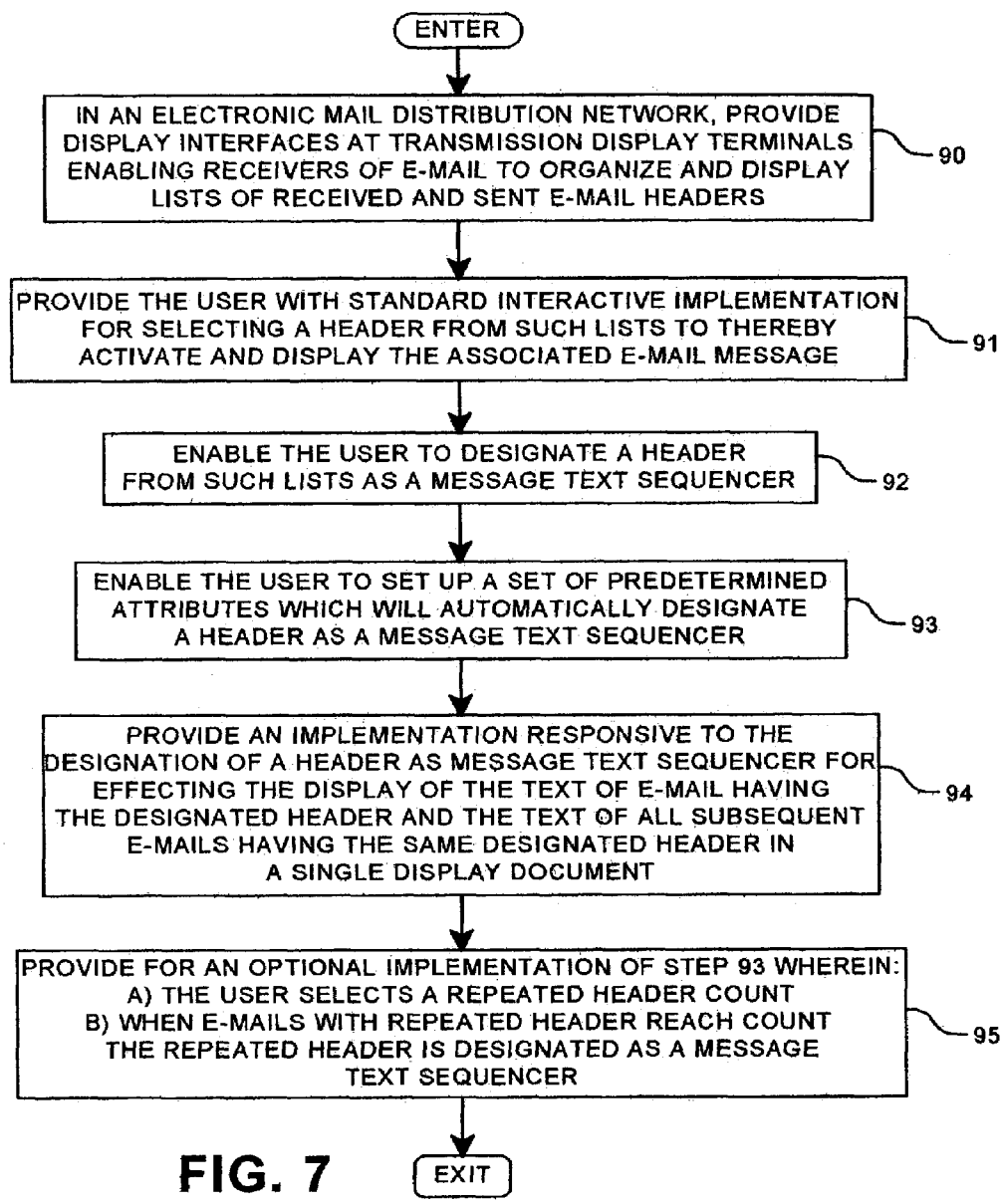
FIG. 7 is an illustrative flowchart describing the setting up of the functions to form message text sequences in accordance with the present invention.

FIG. 7 is a flowchart showing the development of a process according to the present invention for enabling the setting of a system for enabling the functions to form message text sequences in accordance with the present invention. In any standard E-Mail network system, enabling senders at display terminals to distribute E-Mail to specified users, step 90, (reference may to made to such a distribution network as described in the text: *The ABCs of Lotus Notes* 4.5, R. Clayton, published by SYBEX Inc., San Francisco, 1997, particularly Chapter 18, pp. 367-398), there is provided at the senders' and receivers' display interfaces, implementation enabling the users to organize and display lists of received and sent E-Mail headers. The user is also provided with a standard interactive implementation for selecting a header from such lists to thereby activate and display the associated E-Mail message, step 91. The user is enabled to designate a header from such lists as a message text sequencer, step 92. Alternatively, the user is permitted to set up a combination of predetermined attributes that will automatically designate a header as a message text sequencer, step 93. There is further provided an implementation responsive to the designation of a header as a message text sequencer for effecting the display of the text of the E-Mail having such a designated header, and the text of all subsequent E-Mails having the same designated header in a single display document, step 94.

In addition, an optional implementation of step 93 is provided wherein: A) The user selects a repeated header count; and when B) the E-Mail documents with the repeated header reach the selected count, the repeated header is designated as a message text sequencer.

Figure 8:
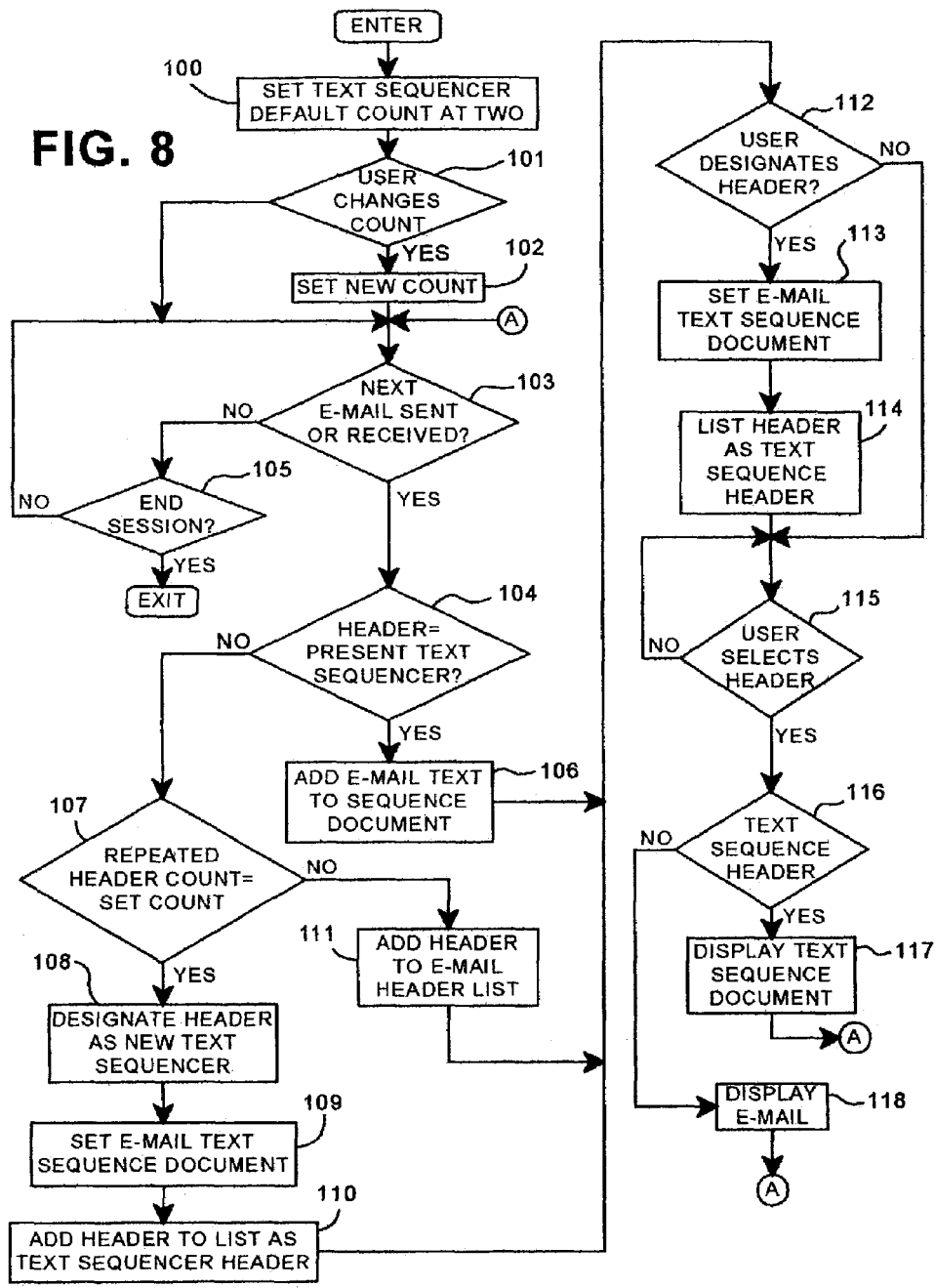
FIG. 8 is a flowchart of an illustrative run of the program set up according to FIG. 7.

A simplified run of the process set up in FIG. 7 and described in connection with FIGS. 3 through 6 will now be described with respect to the flowchart of FIG. 8. At the display terminal of the E-Mail user there is provided an interface such as that of FIGS. 3 through 6. Let us assume that in the automatic system to be described, the system has a default count number of two for the number of repetitions of a header on a sent/received E-Mail document required to automatically trigger the text sequence process, step 100. The user is prompted to change the count. If Yes, step 101, the user changes the count, then the new count is set, step 102. Then, or if No, the default count is not changed, step 103, a determination is made as to whether the next E-Mail is sent or received, step 103. At this step if No, a further decision is made as to whether the session is over, step 105. If Yes, the session is exited. If No, the process is branched back to step 103. If the decision in step 103 is Yes the next E-Mail is sent/received, a determination is made, step 104, as to whether the header is one that has already been designated as a text sequencer. If Yes, then, step 106, the text of the received E-Mail is extracted as previously described and added to the text sequence document. If No, then, step 107, a determination is made as to whether the header is a repetitive header, the count of which has equaled the set count. If No, the header is merely added to the standard E-Mail header lists, step 111. If Yes, the count has equaled the set count, then the repetitive header is designated as a new text sequencer, step 108, and the text from all of the E-Mail with this repetitive header is formed into a text sequence document as described in FIG. 6, step 109. Then, step 110, the header is highlighted on the header list as a designated text sequence header. Next, after either step 106, 110 or 111, a determination may be made at any point in an E-Mail session as to whether the user has designated, step 112, a header to be a new text sequencer. If Yes, a new text sequence document as described in FIG. 6 is opened and the text from the E-Mail with the header and all of the subsequent E-Mail with this repetitive header is formed into this text sequence document, step 113. Also, the header is highlighted on the header list as a designated text sequence header, step 114. At this point or if the determination in step 112 is No, a decision is made, step 115, as to whether the user has elected to open a document by selection of a header from a header list. If No, such a selection is awaited. If Yes, a further determination is made, step 116, as to whether the selected header is a text sequencer header. If No, then the ordinary E-Mail note that it represents is opened and displayed, step 118. If Yes, then the text sequence document as shown in FIG. 6 is displayed, step 117. After either step 117 or 118, the process is branched back via branch "A" to decision step 103.

One of the preferred implementations of the present invention is in application program 40 made up of programming steps or instructions resident in RAM 14, FIG. 1, of Web server computers during various Web operations. Until required by the computer system, the program instructions may be stored in another readable medium, e.g. in disk drive 20, or in a removable memory, such as an optical disk for use in a CD ROM computer input, or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a communication or network with user access via a plurality of data processor controlled interactive display stations and with a system for displaying documents transmitted to receiving display stations from locations remote from said stations, an electronic mail distribution system comprising:
   means for transmitting electronic mail messages to said receiving display stations;
   means for including a subject identifier in each transmitted message;
   means at said receiving display stations for displaying a list of the subject identifiers or received electronic mail messages;
   means for designating a subject identifier of one received electronic mail as a message text sequencer including:
      means for counting the number of messages having the same subject identifier within a predetermined period, wherein said means for designating automatically designates said same subject identifier when said counted number reaches a predetermined value; and
   means at said receiving display station for enabling the display of a chronological sequence or the text of said received message and the text of all subsequent messages having said designated subject identifier.

2. The electronic mail distribution system of claim 1 wherein said means for designating enable a user to interactively designate an identifier as a message text sequencer.

3. The electronic mail distribution system of claim 1 wherein said predetermined value is two.

4. The electronic mail distribution system of claim 3 wherein said predetermined value within said predetermined period is two consecutive messages.

5. The electronic mail distribution system of claim further including means for listing said message text sequencer in said list of subject identifiers as the subject identifier for said chronological sequence of text.

6. In a communication network with user access via a plurality of data processor controlled interactive display stations and with a method for displaying documents transmitted to receiving display stations from locations remote from said stations, an electronic mail distribution method comprising:
   transmitting electronic mail messages to said receiving display stations;
   including a subject identifier in each transmitted message;
   displaying a list of the subject identifiers of received electronic mail messages at said receiving display stations;
   designating a subject identifier of one received electronic mail as a message text sequencer including the step of:
      counting the number of messages having the same subject identifier within a predetermined period; and
      automatically designating said same subject identifier when said counted number reaches a predetermined value; and
   enabling the display of a chronological sequence of the text or said received message and the text of all subsequent messages having said designated subject identifier at said receiving display station.

7. The electronic mail distribution method of claim 6 wherein in said designating step, a user is enabled to interactively designate an identifier as a message text sequencer.

8. The electronic mail distribution method of claim 6 wherein said predetermined value is two.

9. The electronic mail distribution method of claim 8 wherein said predetermined value within said predetermined period is two consecutive messages.

10. The electronic mail distribution method of claim 6 further including the step of listing said message text sequencer in said list of subject identifiers as the subject identifier for said chronological sequence of text.

11. A computer program having code recorded on a computer readable medium for electronic mail distribution in a communication network with user access via a plurality of data processor controlled interactive display stations and with a system for displaying documents transmitted to receiving display stations from locations remote from said stations, said program comprising:

means for transmitting electronic mail messages to said receiving display stations;

means for including a subject identifier in each transmitted message;

means at said receiving display stations for displaying a list of the subject identifiers of received electronic mail messages;

means for designating a subject identifier of one received electronic mail as a message text sequencer including;

means for counting the number or messages having the same subject identifier within a predetermined period, wherein said means for designating automatically designates said same subject identifier when said counted number reaches a predetermined value; and means at said receiving display station for enabling the display of a chronological sequence of the text of said received message and the text of all subsequent messages having said designated subject identifier.

12. The computer program of claim 11 wherein said means for designating enable a user to interactively designate an identifier as a message text sequencer.

13. The computer program of claim 11 wherein said predetermined value is two.

14. The computer program of claim 13 wherein said predetermined value within said predetermined period is two consecutive messages.

15. The computer program of claim 11 further including means for listing said message text sequencer in said list of subject identifiers as the subject identifier for said chronological sequence of text.

16. In a communication network with user access via a plurality of data processor controlled interactive display stations and with a system for displaying documents transmitted to receiving display stations from locations remote from said stations, an electronic mail distribution system comprising:

apparatus for transmitting electronic mail messages to said receiving display stations;

an implementation for including a subject identifier in each transmitted message;

a receiving display station for displaying a list of the subject identifiers of received electronic mail messages;

an implementation for designating a subject identifier of one received electronic mail as a message text sequencer including:

apparatus for counting the number of messages having the same subject identifier within a predetermined period, wherein said implementation for designating automatically designates said same subject identifier when said counted number reaches a predetermined value; and apparatus at said receiving display station for enabling the display of a chronological sequence of the text of said received message and the text or all subsequent messages having said designated subject identifier.

17. The electronic mail distribution system of claim 16 wherein said implementation for designating enables a user to interactively designate an identifier as a message text sequencer.

18. The electronic mail distribution system of claim 16 wherein said predetermined value is two.

19. The electronic mail distribution system of claim 18 wherein said predetermined value within said predetermined period is two consecutive messages.

20. The electronic mail distribution system of claim 16 further including an implementation for listing said message text sequencer in said list of subject identifiers as the subject identifier for said chronological sequence of text.

* * * * *